United States Patent
Shin et al.

(10) Patent No.: US 9,817,286 B1
(45) Date of Patent: Nov. 14, 2017

(54) LIQUID CRYSTAL DISPLAY DEVICE AND MANUFACTURING METHOD THEREOF

(71) Applicant: Samsung Display Co. Ltd., Yongin-si (KR)

(72) Inventors: Cheol Shin, Hwaseong-si (KR); Hak Sun Chang, Yongin-si (KR); Se Hyun Lee, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/355,833

(22) Filed: Nov. 18, 2016

(30) Foreign Application Priority Data

May 4, 2016 (KR) .................. 10-2016-0055501

(51) Int. Cl.
| | | |
|---|---|---|
| *G02F 1/1343* | (2006.01) | |
| *G02F 1/1335* | (2006.01) | |
| *G02F 1/1337* | (2006.01) | |
| *G02F 1/1362* | (2006.01) | |
| *G02F 1/1333* | (2006.01) | |

(52) U.S. Cl.
CPC .. *G02F 1/134363* (2013.01); *G02F 1/133345* (2013.01); *G02F 1/133512* (2013.01); *G02F 1/133514* (2013.01); *G02F 1/133788* (2013.01); *G02F 1/136286* (2013.01); *G02F 2001/133357* (2013.01); *G02F 2001/133746* (2013.01); *G02F 2001/136218* (2013.01); *G02F 2201/121* (2013.01); *G02F 2201/123* (2013.01)

(58) Field of Classification Search
CPC ......... G02F 1/134363; G02F 1/133514; G02F 1/133788; G02F 1/136286; G02F 1/133345; G02F 1/133512; G02F 2201/123; G02F 2201/121; G02F 2001/136218; G02F 2001/133746; G02F 2001/133357

See application file for complete search history.

(56) References Cited

U.S. PATENT DOCUMENTS 9,570,469 B2 * 2/2017 Uchida ............... H01L 27/1225
2008/0303997 A1 * 12/2008 Takeda .............. G02F 1/133707
349/129

(Continued)

FOREIGN PATENT DOCUMENTS

| KR | 1020120113025 | 10/2012 |
|---|---|---|
| KR | 1020170099425 | 9/2017 |

*Primary Examiner* — Joseph L Williams
*Assistant Examiner* — Jose M Diaz
(74) *Attorney, Agent, or Firm* — Cantor Colburn LLP

(57) ABSTRACT

A liquid crystal display device includes: a first substrate; a shielding electrode disposed on the first substrate and which extends in a first direction; a pixel electrode disposed on a same layer as the shielding electrode and insulated from the shielding electrode; a common electrode which overlaps the shielding electrode and the pixel electrode in a thickness direction of the first substrate; and a liquid crystal layer interposed between the common electrode and the pixel and shielding electrodes. The liquid crystal layer includes a first liquid crystal molecule disposed in a first region between the shielding electrode and the pixel electrode, and the first liquid crystal molecule is pre-tilted to have an azimuthal angle in a range of about zero degree to about +45 degrees or in a range of about −45 degrees to about zero degree, based on the first direction.

25 Claims, 24 Drawing Sheets

(56) References Cited

U.S. PATENT DOCUMENTS

| | | | |
|---|---|---|---|
| 2013/0038830 A1* | 2/2013 | Sato | G02F 1/134363 349/149 |
| 2013/0057813 A1* | 3/2013 | Jeong | G02F 1/134309 349/110 |
| 2014/0049714 A1* | 2/2014 | Yoshida | G02F 1/13394 349/42 |
| 2017/0068137 A1* | 3/2017 | Shin | G02F 1/13439 |

* cited by examiner

LIQUID CRYSTAL DISPLAY DEVICE AND MANUFACTURING METHOD THEREOF

This application claims priority to Korean Patent Application No. 10-2016-0055501 filed on May 4, 2016, and all the benefits accruing therefrom under 35 U.S.C. 119, the content of which in its entirety is herein incorporated by reference.

BACKGROUND

1. Field

Embodiments of the invention relate to a liquid crystal display device and a method of manufacturing the liquid crystal display device.

2. Description of the Related Art

The importance of display devices has increased with the development of multimedia. Accordingly, various types of display devices, such as a liquid crystal display and an organic light emitting display, are widely used.

Among them, the liquid crystal display device, which is one of the most widely used types of display device, typically includes two substrates including field-generating electrodes such as a pixel electrode and a common electrode, and a liquid crystal layer interposed therebetween. The liquid crystal display device displays an image, by applying a voltage to the field-generating electrodes to generate an electric field in the liquid crystal layer, and by determining directions of the liquid crystal molecules of the liquid crystal layer through the electric field and thereby controlling the polarization of incident light passing through the liquid crystal layer.

SUMMARY

An embodiment of the invention provides a liquid crystal display device in which a lateral electric field is relaxed due to coupling between a pixel electrode and a shielding electrode.

Also, another embodiment of the invention provides a liquid crystal display device with improved lateral visibility with the relaxation of the lateral electric field.

Further, still another embodiment of the invention provides a method of manufacturing a liquid crystal display device in which the lateral electric field is relaxed due to the coupling between the pixel electrode and the shielding electrode and having improved the lateral visibility.

According to embodiments of the invention, the lateral electric field may be relaxed due to the coupling between the pixel electrode and the shielding electrode, and the lateral visibility may be improved.

In an exemplary embodiment of the invention, a liquid crystal display device includes: a first substrate; a shielding electrode disposed on the first substrate and which extends in a first direction; a pixel electrode disposed on the same layer as the shielding electrode and insulated from the shielding electrode; a common electrode which overlaps the shielding electrode and the pixel electrode in a thickness direction of the first substrate; and a liquid crystal layer interposed between the common electrode and the pixel and shielding electrodes, where the liquid crystal layer includes a first liquid crystal molecule disposed in a first region between the shielding electrode and the pixel electrode, and the first liquid crystal molecules is pre-tilted to have an azimuthal angle in a range of about zero (0) degree to about +45 degrees or in a range of about −45 degrees to about zero (0) degree, based on the first direction.

In an exemplary embodiment of the invention, a liquid crystal display device includes: a first substrate; a shielding electrode disposed on the first substrate and which extends in a first direction; a pixel electrode disposed on the same layer as the shielding electrode and insulated from the shielding electrode, where the pixel electrode includes a stem portion extending in the first direction and a plurality of branch portions extending from the stem portion; a second substrate which faces the first substrate; a common electrode disposed on the second substrate, and which overlaps the pixel electrode and the shielding electrode when view from a plan view in a perpendicular direction based on the first substrate; and a liquid crystal layer interposed between the first substrate and the second substrate, where the liquid crystal molecules includes a first liquid crystal molecule and second liquid crystal molecule. In such an embodiment, the first liquid crystal molecule is in a first region between the shielding electrode and the pixel electrode when viewed from the plan view, and is pre-tilted to have a first azimuthal angle based on the first direction. In such an embodiment, the second liquid crystal molecule is in a second region between two adjacent branch electrodes of the plurality of branch portions when viewed from the plan view, and is pre-tilted to have a second azimuthal angle based on the first direction. In such an embodiment, an absolute value of the first azimuthal angle is smaller than an absolute value of the second azimuthal angle.

In an exemplary embodiment of the invention, a method of manufacturing a liquid crystal display device includes: preparing a first substrate on which a shielding electrode extending in a first direction and a pixel electrode disposed on a same layer as the shielding electrode are provided; preparing a second substrate, on which a common electrode to be disposed to overlap the shielding electrode and the pixel electrode in a direction perpendicular to the first substrate is provided; providing a liquid crystal layer between the first substrate and the second substrate, where the liquid crystal layer includes a first liquid crystal molecule, which is disposed in a first region between the pixel electrode and the shielding electrode; applying a first voltage to the pixel electrode and the shielding electrode, and applying a second voltage different from the first voltage to the common electrode; and irradiating the liquid crystal layer with light to pre-tilt the first liquid crystal molecule.

In an exemplary embodiment, a liquid crystal display device includes: a first substrate; a first scan line disposed on the first substrate and extending in a first direction; a data line disposed on the first substrate and extending in a second direction, which is different form the first direction; a pixel electrode electrically connected to the scan line and the data line; a shielding electrode disposed on the scan line and the data line; a common electrode facing the pixel electrode; and a liquid crystal layer including a plurality of liquid crystal molecules and disposed between the pixel electrode and the common electrode. In such an embodiment, the shielding electrode includes a first sub shielding electrode which overlaps the scan line and is spaced apart from the pixel electrode when viewed from a plan view in a thickness direct of the first substrate, the liquid crystal molecules includes a first liquid crystal molecule disposed in a region between the first sub shielding electrode and the pixel electrode when viewed from the plan view, and a longitudinal axis of the first liquid crystal molecule is pre-tilted at an azimuthal angle in a range of about zero degree to about +45 degrees or in a range of about −45 degrees to about zero degree with respect to the first direction when viewed from the plan view

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
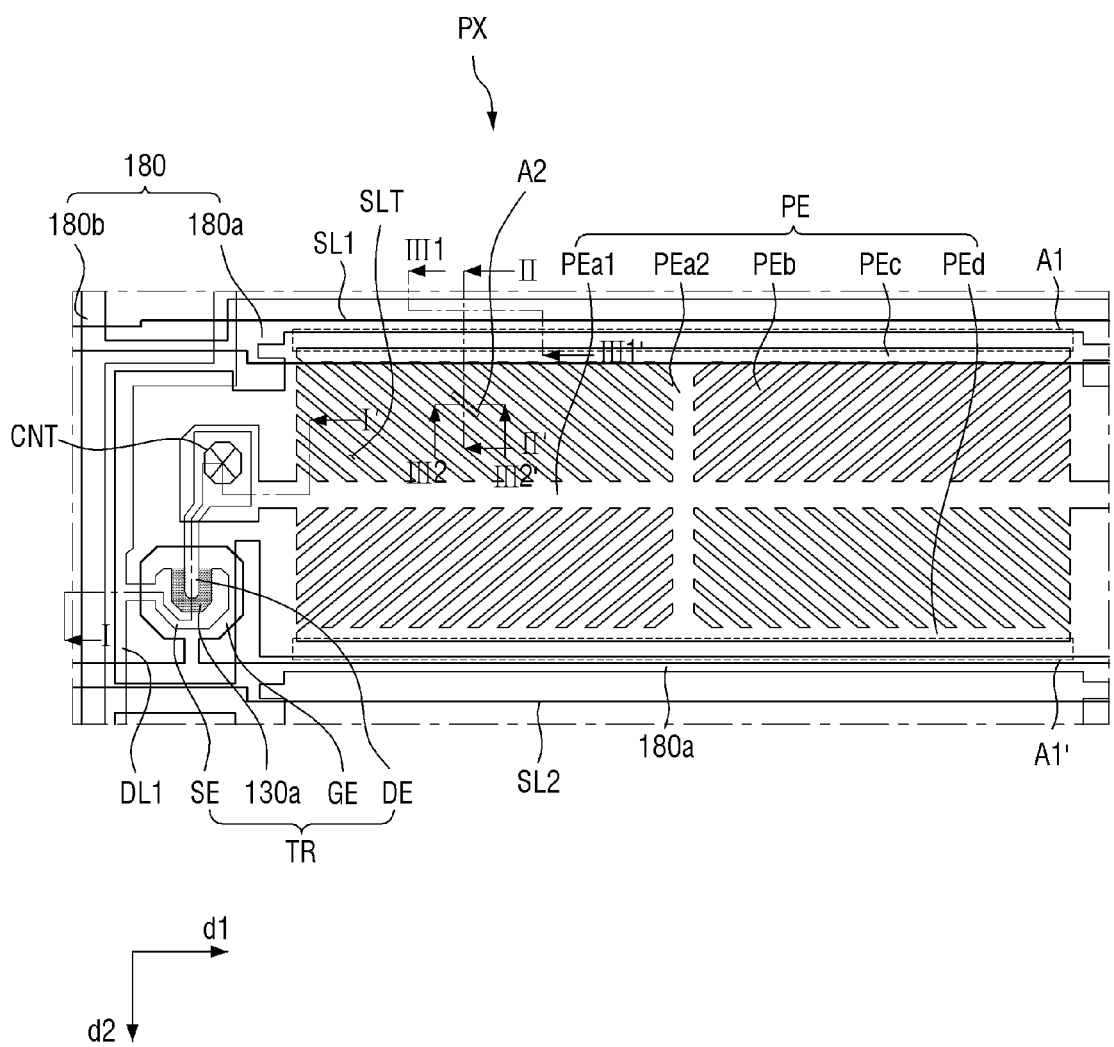
FIG. 1 is a plan view schematically illustrating a pixel portion of a liquid crystal display device according to an embodiment of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. "Or" means "and/or." As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described with reference to the accompanying drawings.

FIG. 1 is a plan view schematically illustrating a pixel portion of a liquid crystal display device according to an embodiment of the invention.

In an embodiment, a liquid crystal display device may include a plurality of pixels, a plurality data lines and a plurality of scan lines. In such an embodiment, the pixels may be arranged substantially in a matrix form, and connected to the data and scan lines. Referring to FIG. 1, in an embodiment of the liquid crystal display device, a pixel portion PX may be connected to a first data line DL1 and a second scan line SL2. The pixel portion PX may be disposed between a first scan line SL1, which is connected to an adjacent pixel portion, and the second scan line SL2.

The first scan line SL1 and the second scan line SL2 may extend in a first direction d1. The second scan line SL2 may receive a scan signal from a scan driving portion or a scan driver, and provide the scan signal to the pixel portion PX. The first data line DL1 may extend in a second direction d2, which is different from the first direction d1. The first data line DL1 may receive a data signal from a data driving portion or a data driver, and may provide the data signal to the pixel portion PX. The first direction d1 may perpendicularly intersect with the second direction d2. In an embodiment, as shown in FIG. 1, the first direction d1 may be a row direction, and the second direction d2 may be a column direction.

In an embodiment, the pixel portion PX may include a switching element TR, a pixel electrode PE and a shielding electrode 180.

The switching element TR may be connected to the second scan line SL2, the first data line DL1 and the pixel electrode PE. The switching element TR may be a three-terminal element, such as a thin film transistor, in an embodiment. Hereinafter, for convenience of description, embodiments where the switching element TR is a thin film transistor will be described in detail. In an embodiment, the gate electrode GE of the switching element TR may be connected to the second scan line SL2, and the source electrode SE of the switching element TR may be connected to the first data line DL1. The drain electrode DE of the switching element TR may be connected to the pixel electrode PE. Thus, the switching element TR is turned on in response to the scan signal provided from the second scan line SL2, and may provide the data signal provided from the first data line DL1 to the pixel electrode PE through the turned-on switching element TR.

The pixel electrode PE may be capacitively coupled with a common electrode CE (see FIG. 2) to be described later. The pixel electrode PE may overlap the common electrode CE when viewed from a top plan view or a plan view in a thickness direction of a lower substrate 110 (see FIG. 5) to be described later. Thus, the pixel portion PX further includes a liquid crystal capacitor formed between the pixel electrode PE and the common electrode CE.

Here, the term "overlap' refers to an arrangement relationship in which, as the two electrodes are disposed adjacent to each other, the two electrodes may be capacitively coupled with each other. The case where the two electrodes are capacitively coupled to each other includes a case where the two electrodes are disposed side by side in a lateral direction, in addition to the case where the two electrodes are disposed in a vertical direction. Hereinafter, in this specification, the case where the two electrodes overlap each other in the vertical direction mean a case where the two electrodes overlap each other in the perpendicular direction with respect to the lower substrate 110 or when viewed in the thickness direction of the lower substrate 110, and the case where the two electrodes overlap in the lateral direction mean a case where the two electrodes overlap each other 110 in a horizontal direction with respect to the lower substrate 110 or when viewed in a plan view in a direction perpendicular to a surface of the lower substrate 110.

The shape of the pixel electrode PE will be described later in great detail with reference to FIGS. 2 through 7.

The shielding electrode 180 may include a first sub shielding electrode 180a which overlaps the scan lines including the first scan line SL1 and the second scan line SL2 in the vertical direction. Thus, the first sub shielding electrode 180a may extend in the same direction as the extending direction of the first scan line SL1 and the second scan line SL2. In such an embodiment, the first sub shielding electrode 180a may extend generally in the first direction d1.

The shielding electrode 180 may further include a second sub shielding electrode 180b which overlaps the data lines including the first data line DL1 in the vertical direction or in the direction perpendicular to the lower substrate 110. Thus, the second sub shielding electrode 180b may extend in the same direction as the extending direction of the first data line DL1. The second sub shielding electrode 180b may extend generally in the second direction d2. The first sub shielding electrode 180a may be electrically connected to the second sub shielding electrode 180b.

In such an embodiment, the first sub shielding electrode 180a may effectively prevent a light leakage phenomenon caused by coupling between the scan lines and pixel electrodes adjacent to each other. The second sub shielding electrode 180b may effectively prevent a light leakage phenomenon caused by coupling between the data lines and the pixel electrodes adjacent to each other.

Figure 2:
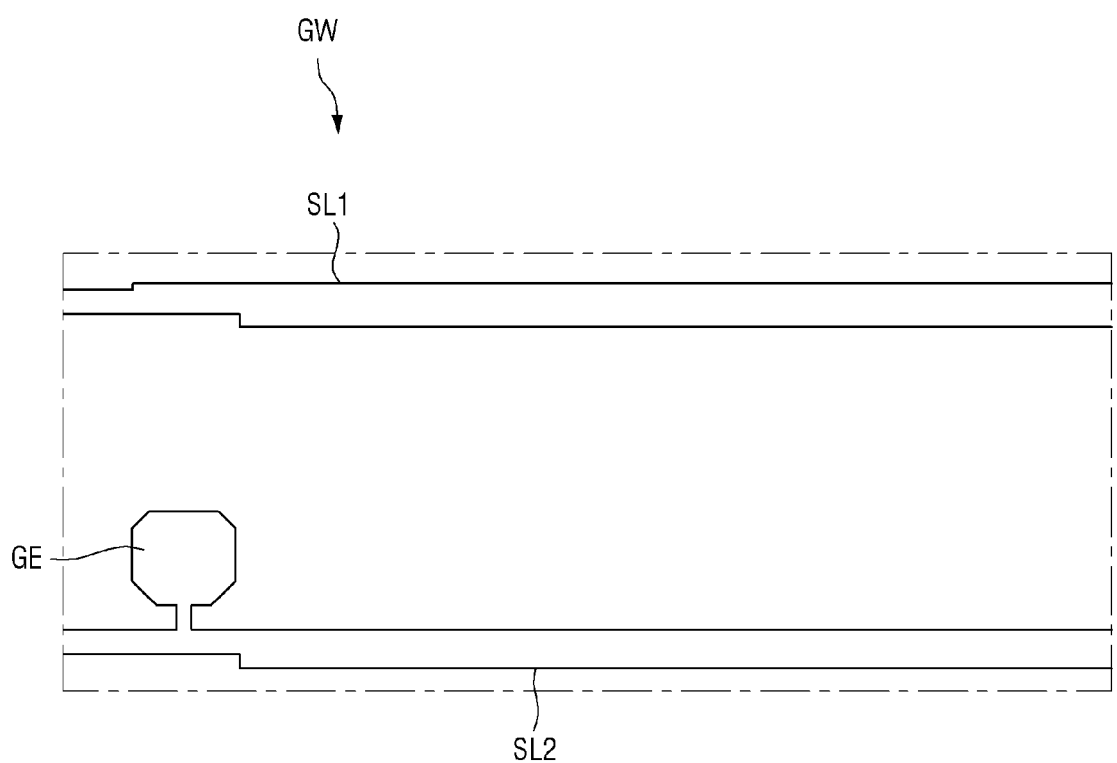
FIG. 2 is a diagram illustrating a gate conductor of the pixel portion illustrated in FIG. 1.
Figure 2:
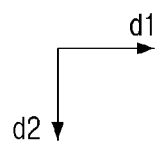
Figure 3:
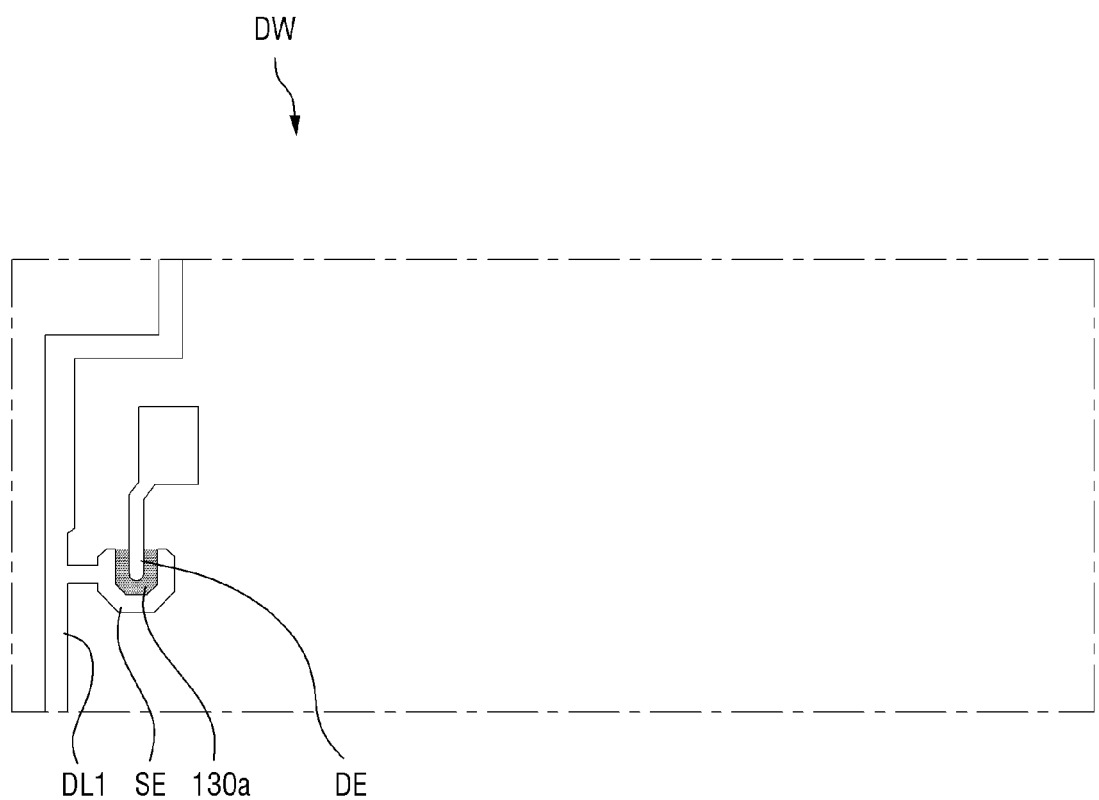
FIG. 3 is a diagram illustrating a data conductor of the pixel portion illustrated in FIG. 1.
Figure 4:
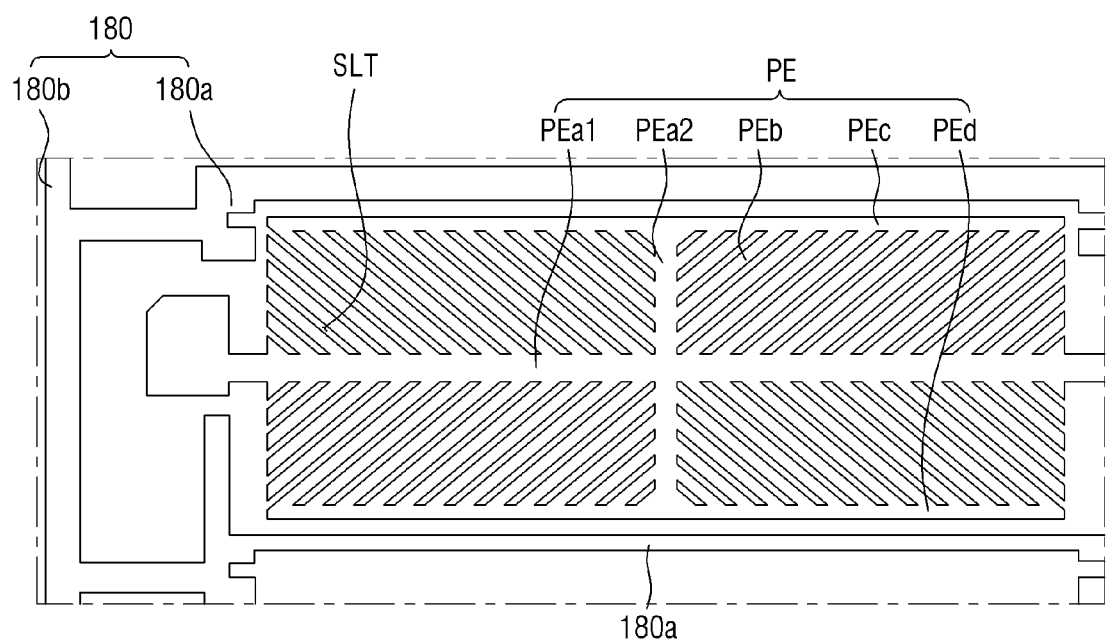
FIG. 4 is a diagram illustrating a pixel electrode and a shielding electrode of the pixel portion illustrated in FIG. 1.
Figure 5:
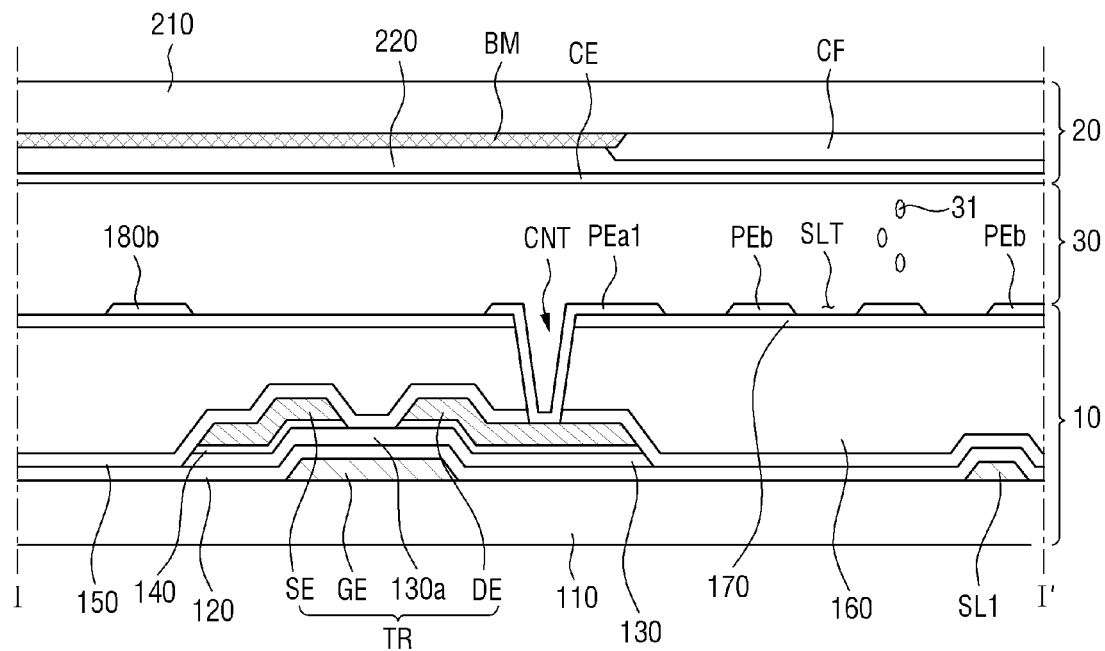
FIG. 5 is a cross-sectional view taken along line I-I' illustrated in FIG. 1.
Figure 6:
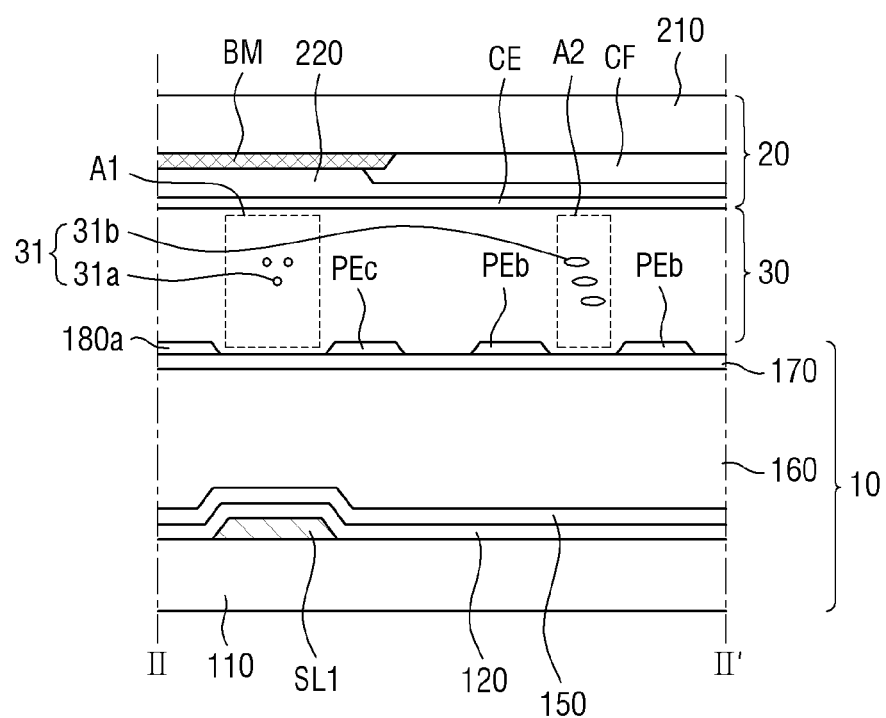
FIG. 6 is a cross-sectional view taken along line II-IF illustrated in FIG. 1.
Figure 7:
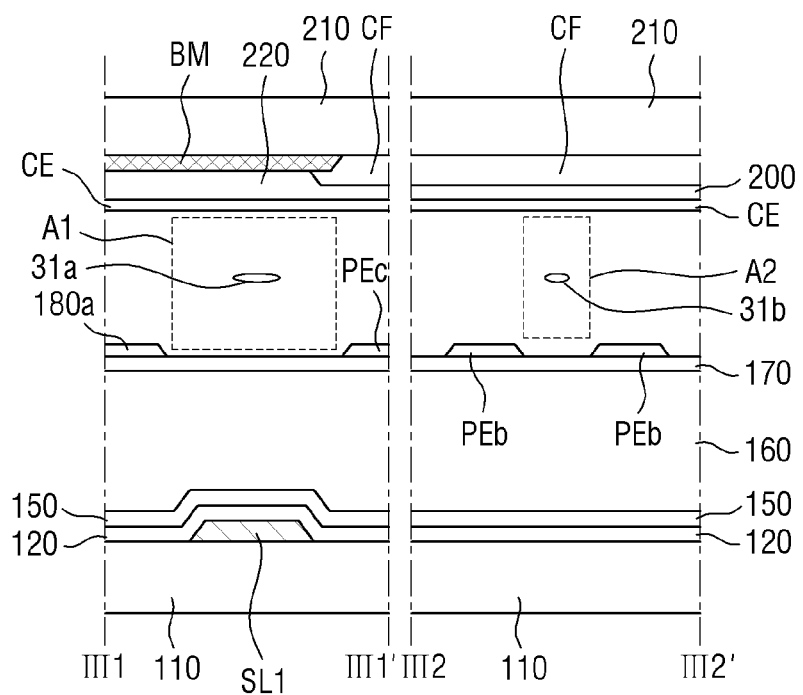
FIG. 7 is a cross-sectional view taken along line III1-III1' and line III2-III2' illustrated in FIG. 1.

FIG. 2 is a diagram illustrating a gate conductor of the pixel portion illustrated in FIG. 1. FIG. 3 is a diagram illustrating a data conductor of the pixel portion illustrated in FIG. 1. FIG. 4 is a diagram illustrating the pixel electrode and the shielding electrode of the pixel portion illustrated in FIG. 1. FIG. 5 is a cross-sectional view taken along line I-I' illustrated in FIG. 1. FIG. 6 is a cross-sectional view taken along line II-IF illustrated in FIG. 1. FIG. 7 is a cross-sectional view taken along line III1-III1' and line III2-III2' illustrated in FIG. 1.

Referring to FIGS. 2 through 7, an embodiment of a liquid crystal display device includes an upper display panel 20 and a lower display panel 10 disposed to face the upper display panel 20. In such an embodiment, the liquid crystal display device further includes a liquid crystal layer 30 interposed between the lower display panel 10 and the upper display panel 20, and including a plurality of liquid crystal molecules 31. The lower display panel 10 may be bonded to the upper display panel 20 through a seal in an embodiment.

First, the lower display panel 10 will be described in detail.

In an embodiment, the lower display panel 10 may include the lower substrate 110. The lower substrate 110 may be a transparent insulating substrate in an embodiment. In one embodiment, for example, the transparent insulating substrate may include a glass substrate, a quartz substrate, a transparent resin substrate or the like.

A gate conductor GW may be disposed therein on the lower substrate 110. The gate conductor GW may include a first scan line SL1, a second scan line SL2 and a gate electrode GE. The first scan line SL1 may extend along the first direction d1 on the lower substrate 110. The first scan line SL1 may be disposed adjacent to the second scan line SL2. Herein, the expression "the two configurations are adjacent to each other" means that the same configuration as the two configurations is not disposed between the two configurations. In an embodiment, as shown in FIGS. 1 through 7, the pixel portion PX may be connected to the second scan line SL2, but it is not limited thereto. Alternatively, the pixel portion PX may also be connected to the first scan line SL1.

The gate electrode GE is disposed on the lower substrate 110 and is connected to the second scan line SL2. The gate electrode GE may be disposed in or directly on the same layer as the first scan line SL1 and the second scan line SL2. The gate electrode GE may have a shape protruding from the second scan line SL2. The gate electrode GE is one of the components that constitute the switching element TR.

In an embodiment, although it is not illustrated in the drawings, the gate conductor GW may further include a storage line. The storage line may be disposed in or directly on the same layer as the gate electrode GE, the first scan line SL1 and the second scan line SL2 in an embodiment. The storage line may surround the pixel electrode PE to be described later and be capacitively coupled with the pixel electrode PE. In such an embodiment, the pixel portion PX may further include a storage capacitor that is capacitively coupled between the storage line and the pixel electrode PE.

The gate conductor GW may have a single film structure and may include at least one conductive metal selected from aluminum (Al), copper (Cu), molybdenum (Mo), chromium (Cr), titanium (Ti), tungsten (W), moly-tungsten (MoW), moly-titanium (MoTi), copper/moly-titanium (Cu/MoTi), for example. Alternatively, the gate conductor GW may have a double film structure including at least two of the conductive metals listed above or a triple film structure including at least three of the conductive metals listed above. The gate conductor GW may be provided or formed simultaneously through a same mask process in an embodiment.

A gate insulating film 120 may be disposed in the lower display panel 10 on the first scan line SL1, the second scan line SL2 and the gate electrode GE. The gate insulating film 120 may include or be formed of silicon nitride (SiNx) or silicon oxide (SiOx) in an embodiment. The gate insulating film 120 may have a multiple film structure including at least two insulating films having different physical characteristics from each other.

Referring to FIGS. 3 and 5, a data conductor DW may be disposed in the lower display panel 10 on the gate insulating film 120. The data conductor DW may include a semiconductor layer 130, a first data line DL1, a source electrode SE and a drain electrode DE.

The semiconductor layer 130 may be disposed on the gate insulating film 120. The semiconductor layer 130 may include a semiconductor pattern 130a that forms a channel region of the switching element TR. The semiconductor layer 130 may include an oxide semiconductor. The semiconductor layer 130 may include or be formed of at least one oxide semiconductor selected from indium-gallium-zinc-oxide ("IGZO"), ZnO, $ZnO_2$, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$ and $Ti_3O_5$, for example. Alternatively, the semiconductor layer 130 may include or be formed of amorphous silicon, polycrystalline silicon or the like, for example.

The data conductors DW may further include an ohmic contact layer 140. The ohmic contact layer 140 may be disposed above or on the top of the semiconductor layer 130. The ohmic contact layer 140 may be interposed between the source/drain electrodes and the semiconductor layer. The ohmic contact layer 140 may include or be made of a material such as n+hydrogenated amorphous silicon doped with n-type impurity such as phosphorus at a high concentration or may be made of silicide. In an embodiment, where the semiconductor layer 130 is made of an oxide semiconductor, the ohmic contact layer 140 may be omitted.

The first data line DL1, the source electrode SE and the drain electrode DE may be disposed on the gate insulating film 120 and the ohmic contact layer 140. The first data line DL1 may extend in the second direction d2 on the lower substrate 110.

A source electrode SE may be branched from the first data line DL1 and may at least partially overlap the gate electrode GE in the vertical direction or in the direction perpendicular to the lower substrate 110. The drain electrode DE overlaps the gate electrode GE in the vertical direction or in the direction perpendicular to the lower substrate 110 and may be disposed to be spaced apart from the source electrode SE at a predetermined distance. In an embodiment, as shown in FIG. 1, the source electrode SE has a U-shape and the drain electrode DE may be surrounded by the source electrode SE, but it is not limited thereto.

The source electrode SE and the drain electrode DE collectively define or constitute a switching element TR, along with the semiconductor layer 130 and the gate electrode GE. The source electrode SE of the switching element TR may be connected to the first data line DL1. The drain electrode DE of the switching element TR may be connected to the pixel electrode PE through a contact hole CNT. The channel region of the switching element TR may be formed between the source electrode SE and the drain electrode DE in response to a scan signal provided from the second scan line SL2 through the gate electrode GE.

Referring to FIG. 3, the data conductor DW may have a single film structure including at least one conductive metal selected from aluminum (Al), copper (Cu), molybdenum (Mo), chromium (Cr), titanium (Ti), tungsten (W), moly-tungsten (MoW), moly-titanium (MoTi), copper/moly-titanium (Cu/MoTi). Alternatively, the data conductor DW may have a double film structure including at least two of the conductive metals listed above or a triple film structure including at least three of the conductive metals listed above. However, the invention is not limited thereto, and the data conductor DW may include or be made of various metals or conductors. The data conductor DW may be provided or formed simultaneously through a same mask process in an embodiment. In such an embodiment, the first data line DL1, the source electrode SE and the drain electrode DE may have an overall shape substantially the same as the shape of the semiconductor layer 130 except the semiconductor pattern 130a.

A first passivation film 150 may be disposed in the lower display panel 10 on the first data line DL1, the source electrode SE and the drain electrode DE. The first passivation film 150 may include or be formed of an inorganic insulating material such as silicon nitride and silicon oxide in an embodiment. The first passivation film 150 may effectively prevent pigment of an organic insulating film 160 to be described later from flowing into the semiconductor pattern 130a.

The organic insulating film 160 may be disposed in the lower display panel 10 on the first passivation film 150. The organic insulating film 160 may include an organic material having high planarization characteristics and photosensitivity. The organic insulating film 160 may define a color filter. In an embodiment, where the organic insulating film 160 is a color filter, the organic insulating film 160 may display one of primary colors such as three primary colors of red, green and blue. In such an embodiment, the color filter CF, which may be disposed in the upper display panel 20 to be described later, may be omitted. Alternatively, the organic insulating film 160 may be omitted.

A second passivation film 170 may be disposed in the lower display panel 10 on the organic insulating film 160. The second passivation film 170 may be formed of an inorganic insulating material such as silicon nitride and silicon oxide in an embodiment.

Referring to FIGS. 4 and 5, the pixel electrodes PE may be disposed in the lower display panel 10 on the second passivation film 170. The pixel electrode PE may include or be formed of a transparent conductive material such as indium tin oxide ("ITO") and indium zinc oxide ("IZO"), and a reflective metal such as aluminum, silver, chromium or an alloy thereof.

In an embodiment, as shown in FIG. 4, the pixel electrodes PE may include a first stem portion PEa1, a second stem portion PEa2, a plurality of branch portions PEb, a first connecting portion PEc and a second connecting portion PEd.

The first stem portion PEa1 may extend in the first direction d1. The second stem portion PEa2 may extend in the second direction d2. The first stem portion PEa1 may intersect with the second stem portion PEa2. The first stem portion PEa1 may intersect with the second stem portion PEa2 at the center portion of the pixel electrode PE in an embodiment.

The plurality of branch portions PEb may extend from one of the first stem portion PEa1 and the second stem portion PEa2 with a predetermined angle. In an embodiment, among the plurality of branch portions PEb, a branch portion extending from the first stem portion PEa1 may form an angle greater than about 45 degrees and less than 90 degrees with the first stem portion PE1a. Herein, the angle refers to an included angle formed between a target and a reference line (or a configuration), and the included angle is an acute angle herein.

Among the plurality of branch portions PEb, the branch portions adjacent to the first scan line SL1 are interconnected by the first connecting portion PEc. Among the plurality of branch portions PEb, the branch portions adjacent to the second scan line SL2 are interconnected by the second connecting portion PEd.

In an embodiment, the first connecting portion PEc may overlap the first scan line SL1 in the vertical direction or in the direction perpendicular to the lower substrate 110 such that the transmittance of the liquid crystal display may be improved. In an embodiment, as shown in FIG. 1, the second connecting portion PEd may not overlap the lower substrate 110 in the vertical direction or in the direction perpendicular to the second scan line SL2 such that a filling rate deterioration phenomenon caused by the kickback phenomenon may be effectively prevented.

In an embodiment, the pixel electrode PE does not overlap the second scan line SL2, which is electrically connected to the pixel electrode PE, in the direction perpendicular to the lower substrate 110, but may overlap the first scan line SL1, which is adjacent to the second scan line SL1 and not electrically connected to the pixel electrode PE, in the direction perpendicular to the lower substrate 110.

The pixel electrode PE may be electrically connected to the drain electrode DE through the contact hole CNT defined through the first passivation film 150, the organic insulating film 160 and the second passivation film 170 to allow the pixel electrode PE to receive a data signal from the first data line DL1 by the switching operation of the switching element TR.

The shielding electrode 180 may be disposed in the lower display panel 10 on the second passivation film 170. The shielding electrode 180 may be disposed in or directly on the same layer as the pixel electrode PE, but it is electrically insulated from the pixel electrode PE. The shielding electrode 180 may include or be formed of a transparent conductive material such as ITO and IZO or a reflective metal such as aluminum, silver, chromium or an alloy thereof in an embodiment.

Referring to FIG. 4, the shielding electrode 180 may be provided or formed simultaneously by a same mask process as the pixel electrode PE in an embodiment.

Although it is not illustrated in the drawings, a first alignment film may be disposed on the pixel electrode PE and the shielding electrode 180. The first alignment film may include or be formed of polyimide or the like.

Next, the upper display panel 20 will be described in greater detail.

In an embodiment, the upper display panel 20 may include an upper substrate 210 disposed to face the lower substrate 110. The upper substrate 210 may include or be formed of a transparent glass or plastic, and may be formed of the same material as the lower substrate 110 in an embodiment.

A black matrix BM may be disposed in the upper display panel 20 on the upper substrate 210 to effectively prevent light from passing through a region other than the pixel region. The black matrix BM may include or be formed of an organic substance or a metallic material containing chromium in an embodiment.

The color filter CF may be disposed in the upper display panel 20 on the black matrix BM and the upper substrate 210. The color filter CF may display, but not limited to, one of primary colors such as three primary colors of red, green and blue. The color filter CF may include or be formed of a predetermined material to display one of the primary colors, and color filters CF of adjacent pixels may display different colors from each other.

A planarization layer 220 may be disposed in the upper display panel 20 on the color filter CF and the black matrix BM. The planarization layer 220 may include or be formed of an insulating material. In an alternative embodiment, the planarization layer 220 may be omitted.

The common electrode CE may be disposed in the upper display panel 20 on the planarization layer 220. The common electrode CE may be disposed to overlap the pixel electrode PE in the vertical direction or in the direction perpendicular to the lower substrate 110. The common electrode CE may have a plate-like shape in an embodiment. In an embodiment, the liquid crystal display device may include a single common electrode CE integrally formed as a single unitary and indivisible unit. In an embodiment, the common electrode CE may include or be formed of a transparent conductive material such as ITO and IZO, or a reflective metal such as aluminum, silver, chromium or an alloy thereof in an embodiment.

Although it is not illustrated in the drawings, a second alignment film (not illustrated) may be disposed on the common electrode CE. The second alignment film may include or be formed of polyimide or the like.

Hereinafter, the liquid crystal layer 30 will be described.

Referring to FIGS. 5 through 8, the liquid crystal layer 30 includes a plurality of liquid crystal molecules 31 having a negative dielectric anisotropy. The liquid crystal molecules 31 may change the polarization of light by rotating or tilting in a particular direction, when an electric field is generated between the lower substrate 110 and the upper substrate 210, e.g., between the pixel electrode PE and the common electrode CE, in an embodiment.

In an embodiment, the liquid crystal molecules 31 are tilted with a predetermined angle, when no electric field is applied thereto or no electric field is generated between the lower substrate 110 and the upper substrate 210.

In such an embodiment, when no electric field is generated between the lower substrate 110 and the upper substrate 210, among the plurality of first liquid crystal molecules 31, a plurality of first liquid crystal molecules 31*a* disposed in the first region A1 may be pre-tilted to have an azimuthal angle in a range of about zero (0) degree to about +45 degrees or in a range of about −45 degrees to about zero (0) degree with reference to the first direction d1. Herein, the first region A1 is defined as a region between the first connecting portion PEc of the pixel electrode PE and the first shielding electrode 180*a* or a region between the second connecting portion PEd of the pixel electrode PE and the first shielding electrode 180*a*. Herein, the azimuthal angle refers to an angle in which the projection from the top of the surface of the lower substrate 110 is tilted with reference to the first direction d1. That is, the azimuthal angle refers to an included angle between the target and the first direction d1, and the included angle is an acute angle herein.

When no electric field is generated between the lower substrate 110 and the upper substrate 210, among the plurality of liquid crystal molecules 31, a plurality of second liquid crystal molecules 31*b* disposed in a second region A2 may be pre-tilted in a direction substantially parallel to the extending or lengthwise direction of the plurality of branch portions PEb. In an embodiment, the azimuthal angle of the plurality of second liquid crystal molecules 31*b* may be greater than the azimuthal angle of the plurality of first liquid crystal molecules 31*a*. Here, although the second region A2 may be defined as a plurality of regions located between the two adjacent branch portions among the plurality of branch portions PEb, the second region A2 will hereinafter be described in greater detail based on the region illustrated in FIGS. 1 through 8.

Figure 8A:
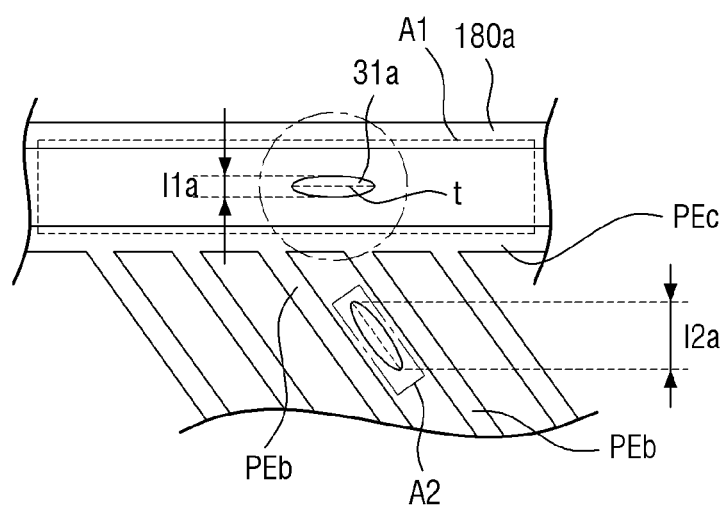
FIGS. 8A to 8C are diagrams for explaining an alignment direction of the liquid crystal in the liquid crystal display device according to an embodiment of the invention.
Figure 8A:
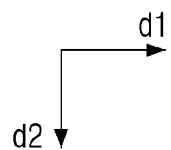
Figure 8B:
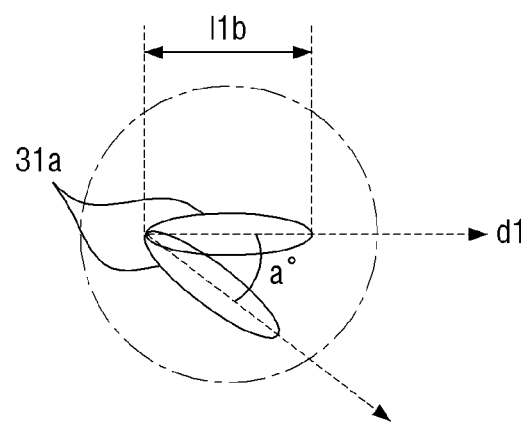
Figure 8C:
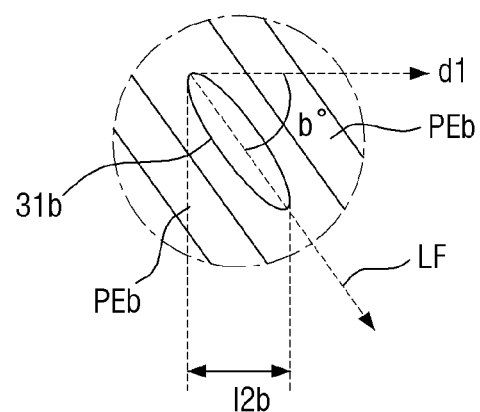

The second region A2 in one embodiment will be described with reference to FIGS. 6 through 8. FIGS. 8A to 8C are diagrams for explaining the alignment direction of the liquid crystals of the liquid crystal display device according to an embodiment of the invention. More particularly, FIGS. 8B and 8C are enlarged views of the encircled portions showing one first liquid crystal molecule 31*a* in the first region A1 and one second liquid crystal molecule 31*b* in the second redoing A2, respectively.

FIGS. 6 to 8C are diagrams illustrating one embodiment in which a plurality of first liquid crystal molecules 31*a* is pre-tilted to be substantially parallel to the first direction d1 (e.g., to have an azimuthal angle of about zero degree), and a plurality of second liquid crystal molecules 31*b* is pre-tilted to be substantially parallel to the lengthwise direction of the plurality of branch portions PE1*b*, for the convenience of explanation.

In such an embodiment, as described above, when no electric field is generated between the lower substrate 110 and the upper substrate 210, the first liquid crystal molecule 31*a* is pre-tilted so that a longitudinal axis is substantially parallel to the first direction d1, and the second liquid crystal molecule 31*b* is pre-tilted to have a predetermined angle with reference to the first direction d1, e.g., to be substantially parallel to the extending or lengthwise direction of a plurality of branch portions PEb.

In such an embodiment, since the azimuthal angle of the second liquid crystal molecule 31*b* is greater than the azimuthal angle of the first liquid crystal molecule 31*a*, when the first region A1 and the second region A2 are seen from a cross-sectional view cut along the second direction d2 (e.g., along line II-IF of FIG. 1), as illustrated in FIG. 6, the first liquid crystal molecules 31*a* have a shape that is relatively closer to a circle than the second liquid crystal molecules 31*b*. Accordingly, as shown in FIG. 8A, the size or length 11*a* in the second direction d2 of the first liquid crystal molecule 31*a* is smaller than the size or length 12*a* in the second direction d2 of the second liquid crystal molecule 31*b*.

In such an embodiment, when the first region A1 and the second region A2 are seen from a cross-sectional view cut along the first direction d1 (e.g., long line of FIG. 1), as illustrated in FIG. 7, the first liquid crystal molecules 31*a* have an oval shape that is relatively longer than the second liquid crystal molecules 31*b*. Accordingly, as shown in FIGS. 8B and 8C, the size or length 11*b* in the first direction d1 of the first liquid crystal molecule 31*a* is larger than the size or length 12*b* in the first direction d1 of the second liquid crystal molecule 31*b*.

When no electric field is generated between the lower substrate 110 and the upper substrate 210, the first liquid crystal molecules 31*a* are pre-tilted to be substantially parallel to the first direction d1. Thus, when an electric field is generated between the lower substrate 110 and the upper substrate 210, a lateral field generated in an outer region of the pixel portion PX surface may be relaxed such that the lateral visibility of the pixel portion PX is improved.

In an embodiment, as illustrated in FIGS. 8A to 8C, an azimuthal angle (a) of the first liquid crystal molecules 31*a* located in the first region A1 with respect to the first direction d1 may be in a range of about zero (0) degree to about +45 degrees. In such an embodiment, an azimuthal angle (a') of the first liquid crystal molecules 31*a* located in another first region A1' (see FIG. 1) between the second connecting portion PEd and the first sub shielding electrode 180b adjacent thereto with respect to the first direction d1 may be in a range of about −45 degrees to about zero (0) degree. However, +45 degrees and −45 degrees are relative angles with reference to the first direction d1. In such an embodiment, the first liquid crystal molecules 31a may be tilted in a direction close to the pixel electrode PE with reference to the first direction d1, and an absolute value of the azimuthal angle as a tilted angle may be in a range of about zero (0) degree to about 45 degrees.

In such an embodiment, the second liquid crystal molecules 31b located in the second region A2 may be pre-tilted to be substantially parallel to the lengthwise direction of the branch portion PEb. The branch portion PEb and the first stem portion PEa1 or the second stem portion PEa2 may form an included angle that is greater than about +45 degrees and less than about +90 degrees, or greater than about −90 degrees and less than about −45 degrees in an embodiment. Thus, the azimuthal angle (b) of the second liquid crystal molecules 31b located in the second region A2 with respect to the first direction d1 may be greater than about +45 degrees and less than about +90 degrees, or greater than about −90 degrees and less than about −45 degrees. In such an embodiment, the absolute value of the azimuthal angle of the plurality of second liquid crystal molecules 31b may be greater than the absolute value of the azimuthal angle of the plurality of first liquid crystal molecules 31a.

Figure 9:
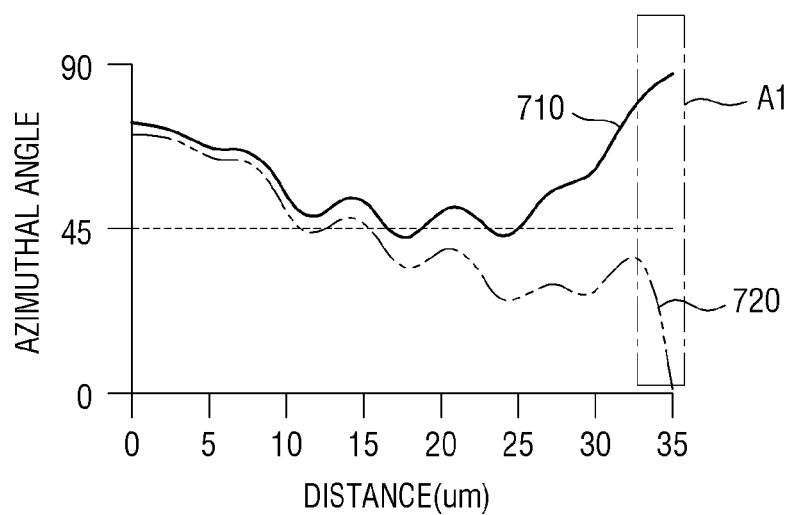
FIG. 9 is a graph for comparing an azimuthal angle of the liquid crystal molecules according to an embodiment of the invention with an azimuthal angle of the liquid crystal molecules according to a comparative embodiment.

This will be described in greater detail with reference to FIG. 9. FIG. 9 is a graph for comparing an azimuthal angle 720 of the liquid crystal molecules according to an embodiment of the invention with an azimuthal angle 710 of the liquid crystal molecules according to a comparative embodiment. In FIG. 9, a region A1 corresponds to the region A1 of FIG. 1. The embodiment of the invention shown in FIG. 9 is the liquid crystal display device manufactured by an embodiment of a method of FIG. 15 described below, where different voltages are applied to the shielding electrode 180 and the common electrode CE, while the comparative embodiment is substantially the same as the embodiment of the invention except that a same voltage is applied to the shielding electrode 180 and the common electrode CE during the manufacturing process thereof.

Referring to FIGS. 8A to 9, in the liquid crystal display device according to an embodiment of the invention, the absolute value of the azimuthal angle of the first liquid crystal molecules 31a located in the first region A1 is in a range of about zero (0) degree to about 45 degrees. In a comparative embodiment of the liquid crystal display device, the absolute value of the azimuthal angle of the liquid crystal molecules located in the first region A1 is greater than about 45 degrees.

That is, in the first region A1, the liquid crystal molecules of the liquid crystal display device according to the comparative embodiment may be arranged to be closer to the second direction d2 than the liquid crystal molecules of the liquid crystal display device according to an embodiment of the invention. As a result, the liquid crystal molecules of the liquid crystal display device according to the comparative embodiment may be tilted to be closer to the second direction d2 than the liquid crystal molecules of the liquid crystal display device according to an embodiment of the invention. Thus, the lateral visibility of the liquid crystal display device according to an embodiment of the invention may be improved as compared to the liquid crystal display device according to the comparative embodiment. This will be described in greater detail with reference to FIG. 10.

Figure 10:
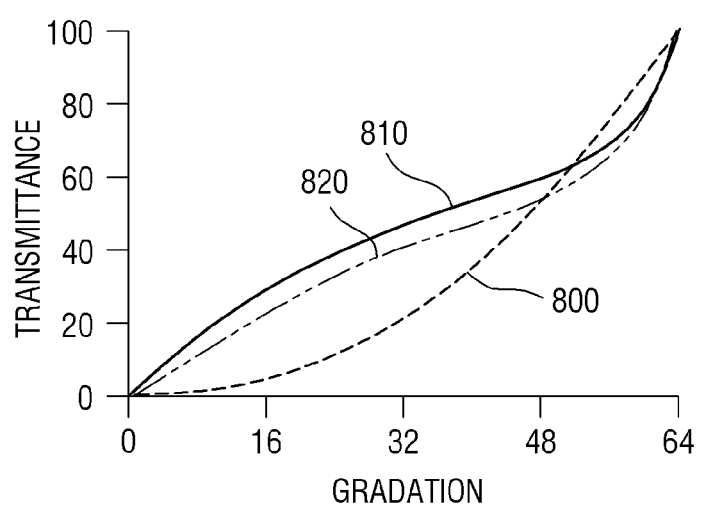
FIG. 10 is a graph for explaining an effect of the liquid crystal display device according to an embodiment of the invention.

FIG. 10 is a graph for explaining the effect of the liquid crystal display device according to an embodiment of the invention. The first graph 800 in FIG. 10 illustrates a reference front gamma curve, and the second graph 810 illustrates a lateral gamma curve of the liquid crystal display device according to the comparative embodiment. Further, the third graph 820 illustrates a lateral gamma curve of the liquid crystal display device according to an embodiment of the invention.

Referring to FIG. 10, it may be understood that the lateral gamma curve (820) of the liquid crystal display device according to an embodiment of the invention is relatively closer to the reference front gamma curve than the lateral gamma curve (810) of the liquid crystal display device according to the comparative embodiment. Accordingly, as shown in FIG. 10, the image quality of the liquid crystal display device according to an embodiment of the invention is substantially improved compared to the liquid crystal display device according to the comparative embodiment.

Figure 11:
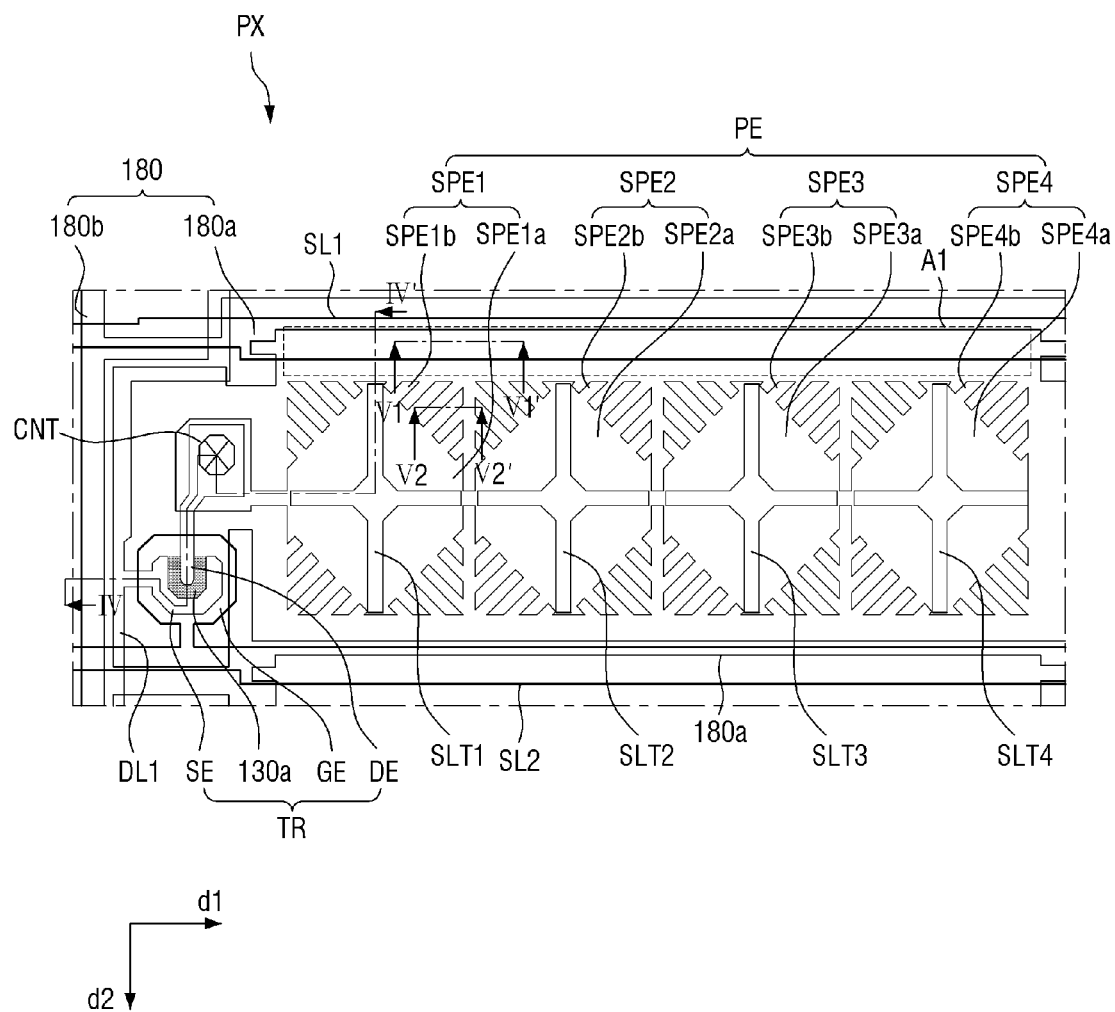
FIG. 11 is a plan view schematically illustrating a pixel portion of a liquid crystal display device according to an alternative embodiment of the invention.
Figure 12A:
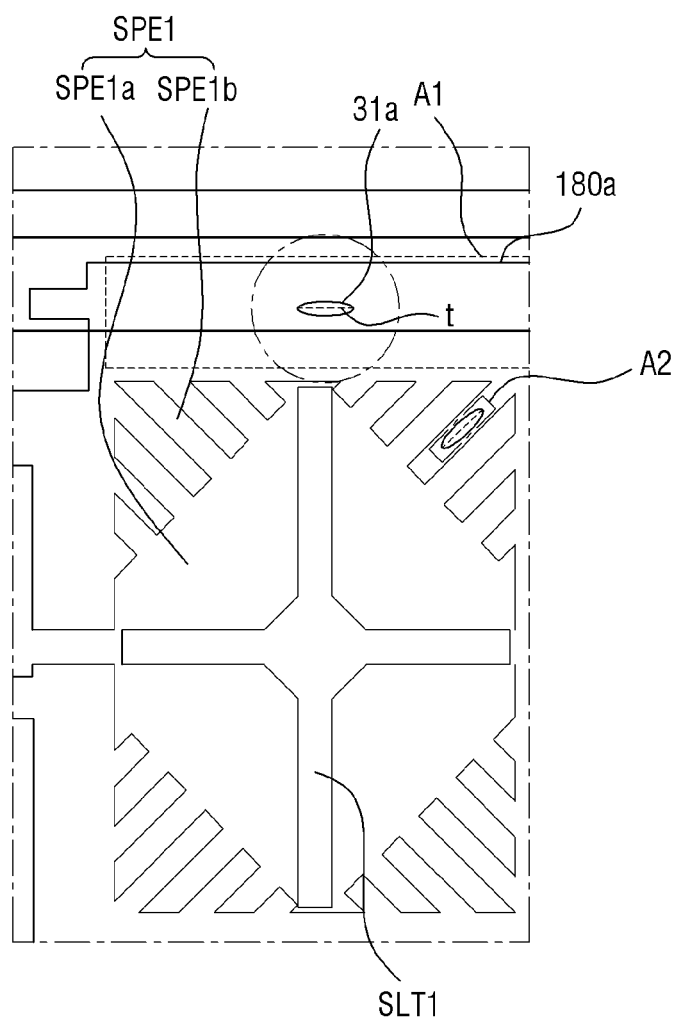
FIGS. 12A to 12C are diagrams for explaining the alignment direction of the liquid crystal in the liquid crystal display device according to an alternative embodiment of the invention.
Figure 12B:
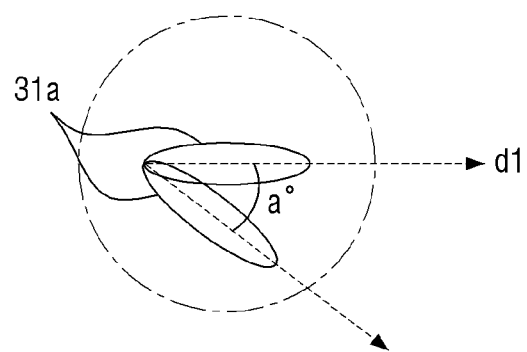
Figure 12C:
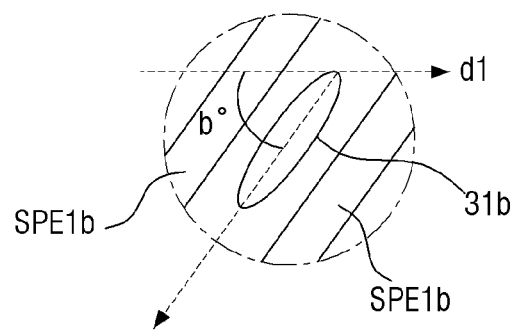
Figure 13:
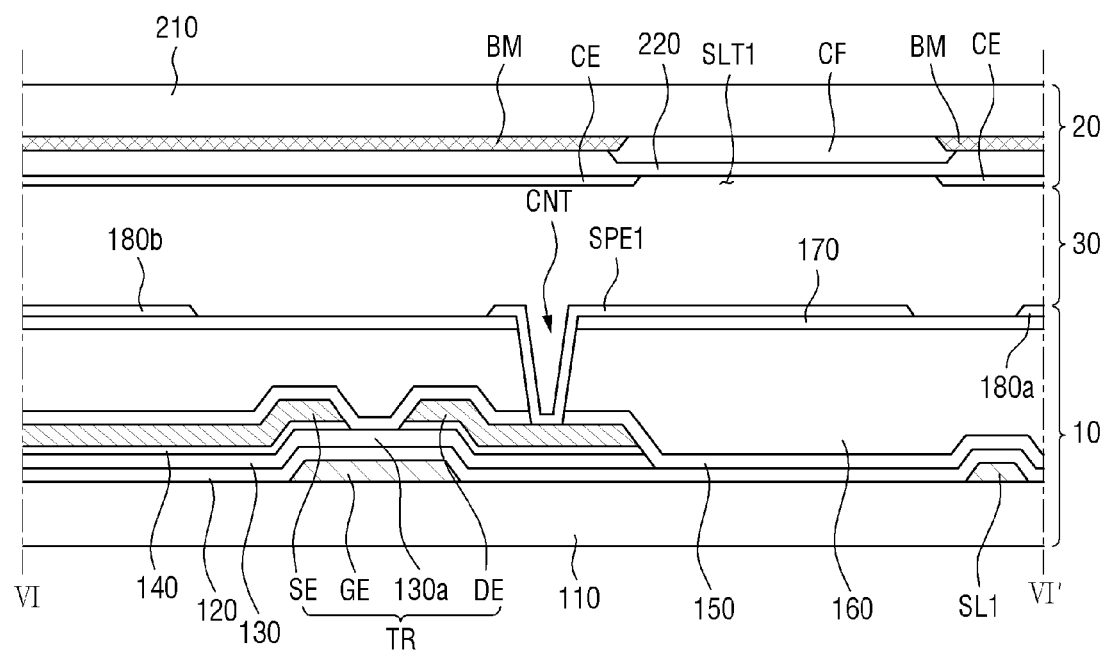
FIG. 13 is a cross-sectional view taken along line IV-IV' illustrated in FIG. 11.
Figure 14:
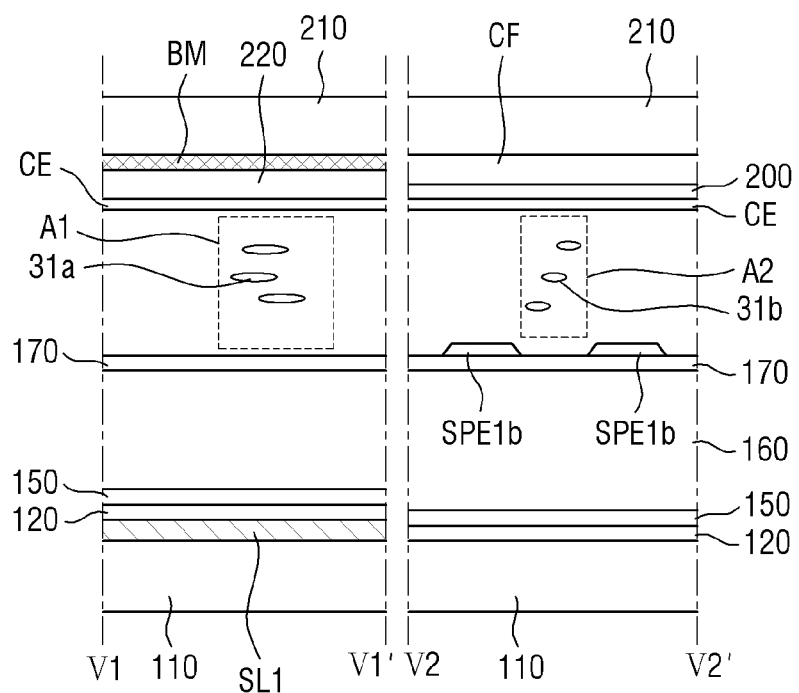
FIG. 14 is a cross-sectional view taken along line V1-V1' and line V2-V2' illustrated in FIG. 11.

FIG. 11 is a plan view schematically illustrating a pixel portion of a liquid crystal display device according to an alternative embodiment of the invention. FIGS. 12A to 12C are diagrams for explaining the alignment direction of the liquid crystal in the liquid crystal display device according to an alternative embodiment of the invention. FIG. 13 is a cross-sectional view taken along line IV-IV' illustrated in FIG. 11. FIG. 14 is a cross-sectional view taken along line V1-V1' and line V2-V2' illustrated in FIG. 11. More particularly, FIGS. 12B and 12C are enlarged views of the encircled portions showing one first liquid crystal molecules 31a in the first region A1, and one second liquid crystal molecule 31b in the second regions A2, respectively.

The pixel portion of a liquid crystal display device in FIGS. 11 to 14 is substantially the same as the pixel portion of a liquid crystal display device shown in FIGS. 1 to 10 except for the pixel electrode PE. The same or like elements shown in FIGS. 11 to 14 have been labeled with the same reference characters as used above to describe those shown in FIGS. 1 to 10, and any repetitive detailed description thereof will hereinafter be omitted or simplified.

Referring to FIGS. 11 to 14, in an embodiment, the pixel electrode PE may include at least two sub-pixel electrodes. In one embodiment, for example, the pixel electrode PE may include first to fourth sub-pixel electrodes SPE1 to SPE4. Hereinafter, for convenience of description, an embodiment where the pixel electrode PE includes the first to fourth sub-pixel electrodes SPE1 to SPE4 will be described in detail with reference to FIGS. 11 to 14.

In an embodiment, the pixel electrode PE may include first to fourth sub-pixel electrodes SPE1 to SPE4 that are spaced apart from each other. The first to fourth sub-pixel electrodes SPE1 to SPE4 may be disposed along the first direction d1 in an embodiment. That is, the first to fourth sub-pixel electrodes SPE1 to SPE4 may be arranged along a same line.

The first to fourth sub-pixel electrodes SPE1 to SPE4 may be electrically and physically connected to one another. The first to fourth sub-pixel electrodes SPE1 to SPE4 may have the same shape as each other in an embodiment. Thus, for convenience of description, the first sub-pixel electrode SPE1 will be mainly described.

The first sub-pixel electrode SPE1 may include a first plate-shaped portion SPE1a and a plurality of first extension portions SPE1b. The first plate-shaped portion SPE1a may be in a plate shape having the form of a rhombus or a rhombus-like shape, in an embodiment. Here, the plate shape refers to a single plate shape that is not divided into a plurality part spaced apart from each other. The first plate-shaped portion SPE1a may overlap a first slit portion SLT1 of the common electrode CE to be described later. The plurality of first extension portions SPE1b may extend from the first plate-shaped portion SPE1a. The plurality of first extension portions SPE1b may extend from at least one edge or side of the first plate-shaped portion SPE1a having the form of rhombus in an embodiment.

The common electrode CE may include the first to fourth slit portions SLT1 to SLT4. The first to fourth slit portions SLT1 to SLT4 may be defined by an open portion formed through the common electrode CE in which the transparent conductive material is not formed. The first to fourth slit portions SLT1 to SLT4 may have the same shape in an embodiment. Hereinafter, the first slit portion SLT1 will be mainly described. The first slit portion SLT1 may have generally a cross shape. The first slit portion SLT1 may overlap the first plate-shaped portion SPE1a.

In an embodiment of the liquid crystal display device according to the invention, when no electric field is generated between the lower substrate 110 and the upper substrate 210, the plurality of liquid crystal molecules 31 is tilted to have a predetermined angle.

In such an embodiment, the a liquid crystal layer 30 of the liquid crystal display device may further include a first region A1 which overlaps a region between the pixel electrode PE and the first sub shielding electrode 180a in the vertical direction, and a second region A2 which overlaps a region between two adjacent first extension portions SPE1b in the vertical direction.

In such an embodiment, when no electric field is generated between the lower substrate 110 and the upper substrate 210, among the plurality of liquid crystal molecules 31, a plurality of first liquid crystal molecules 31a disposed in the first region A1 may be pre-tilted to have the azimuthal angle in a range of about zero (0) degree to about +45 degrees or in a range of about −45 degrees to about zero (0) degree, with respect to the first direction d1.

When no electric field is generated between the lower substrate 110 and the upper substrate 210, among the plurality of liquid crystal molecules 31, a plurality of second liquid crystal molecules 31b disposed in the second region A2 may be pre-tilted in a direction substantially parallel to the lengthwise direction of the plurality of first extension portions SPE1b. The absolute value of the azimuthal angle of the plurality of second liquid crystal molecules 31b with respect to the first direction d1 may be greater than the absolute value of the azimuthal angle of the plurality of first liquid crystal molecules 31a with respect to the first direction d1.

Therefore, in such an embodiment of the liquid crystal display device according to the invention, when no electric field is generated between the lower substrate 110 and the upper substrate 210, the first liquid crystal molecules 31a are pre-tilted to be substantially parallel to the first direction d1. Thus, when an electric field is generated between the lower substrate 110 and the upper substrate 210, the lateral field generated in the outer region of the pixel portion PX may be relaxed. Thus, the lateral visibility of the pixel portion PX is improved.

Figure 15:
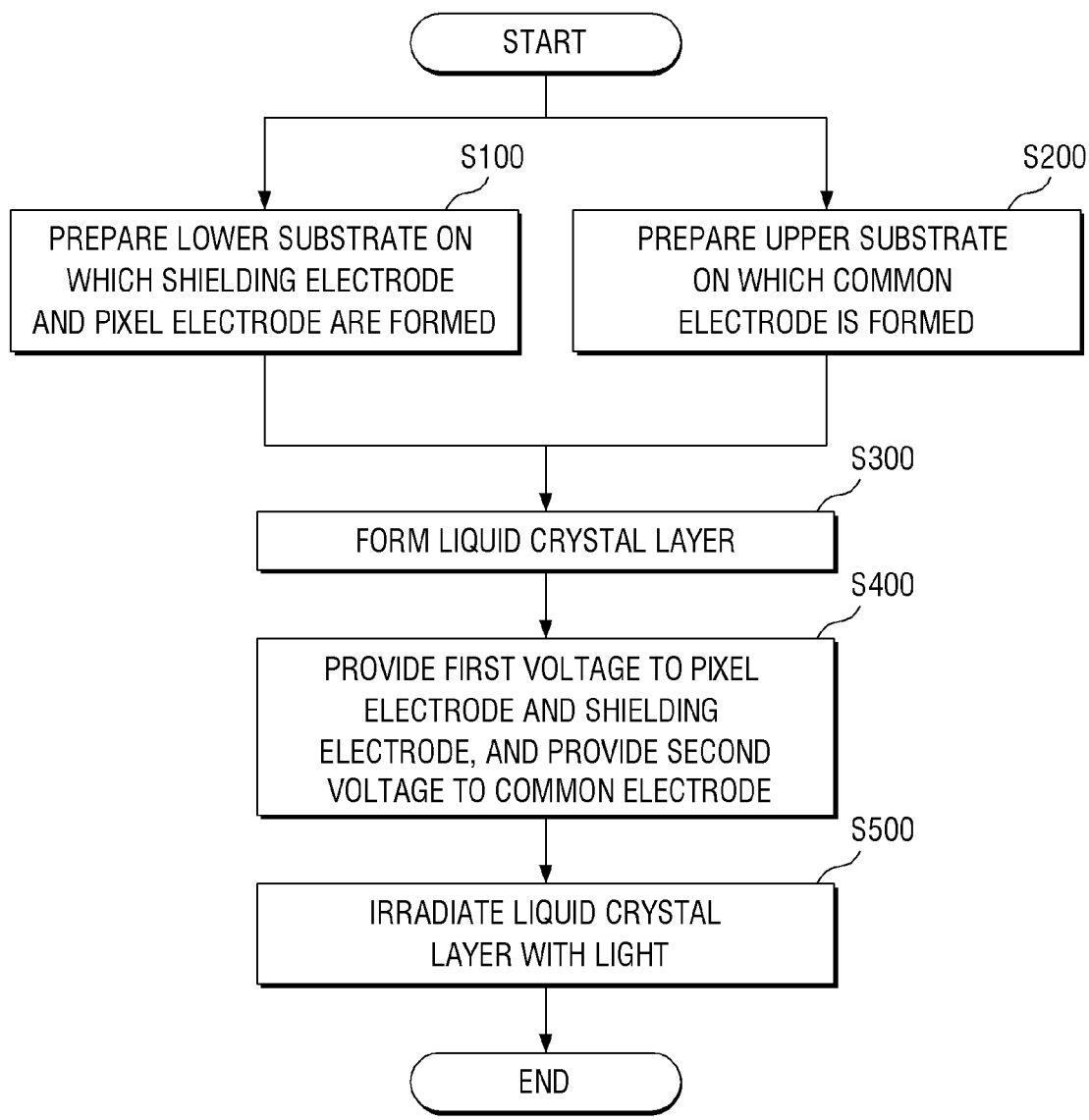
FIG. 15 is a flowchart illustrating a method of manufacturing the liquid crystal display device according to an embodiment of the invention.
Figure 16:
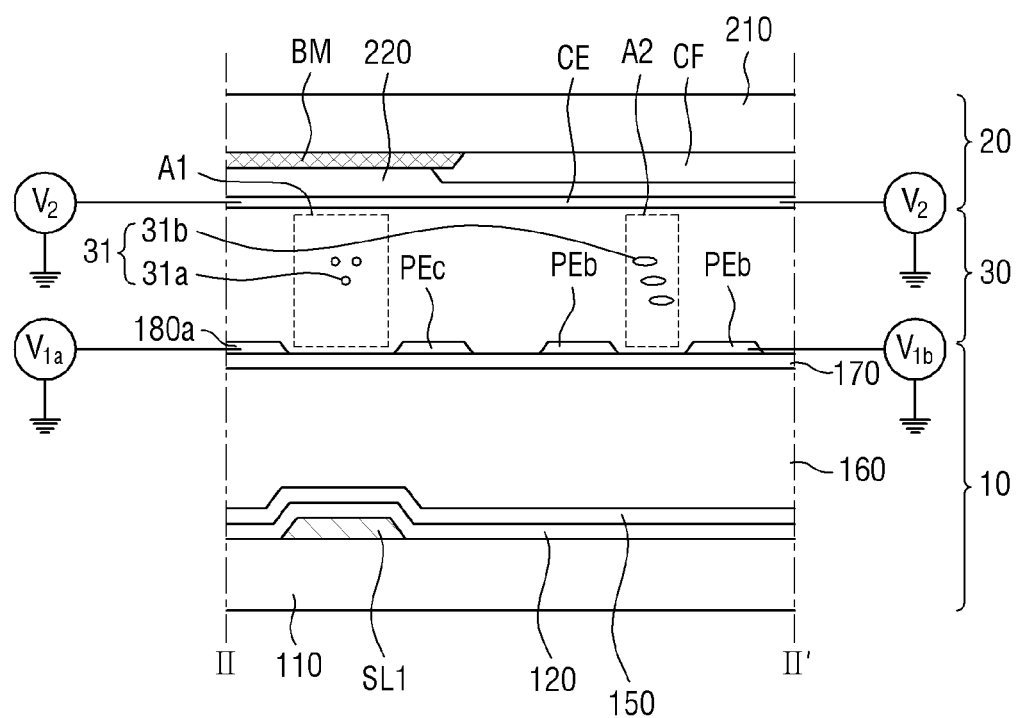
FIGS. 16 to 18 are diagrams for explaining an electric field application process in the method for manufacturing the liquid crystal display device according to an embodiment of the invention.
Figure 17A:
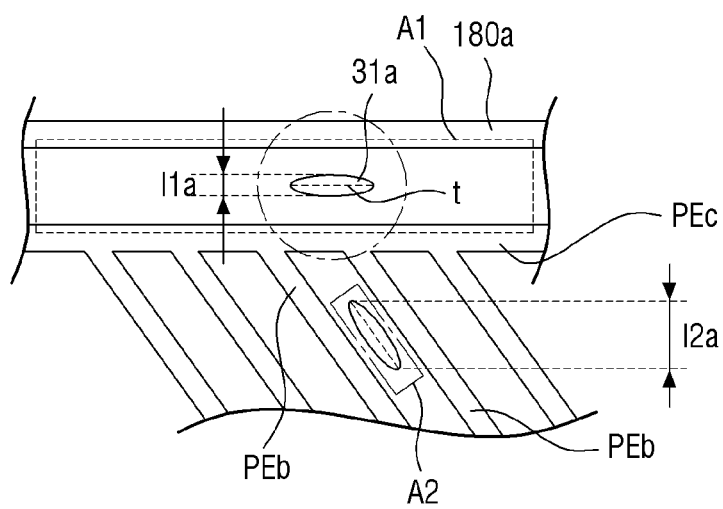
Figure 17A:
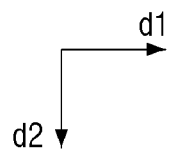
Figure 17B:
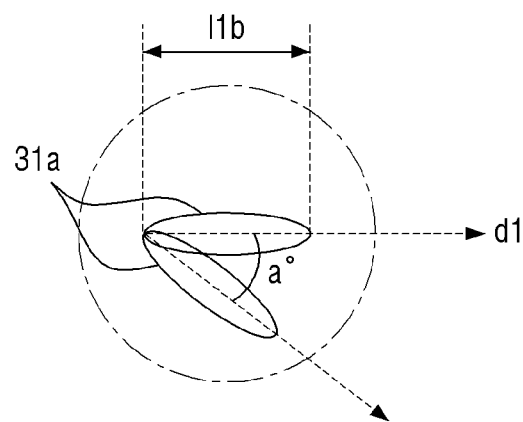
Figure 17C:
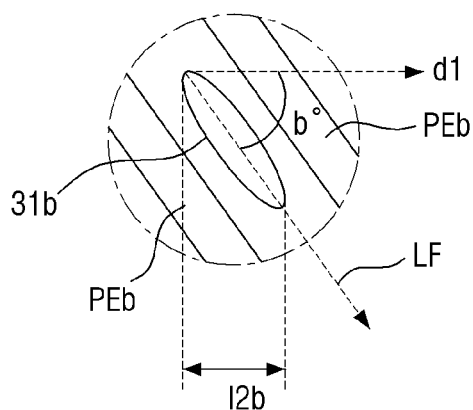
Figure 18:
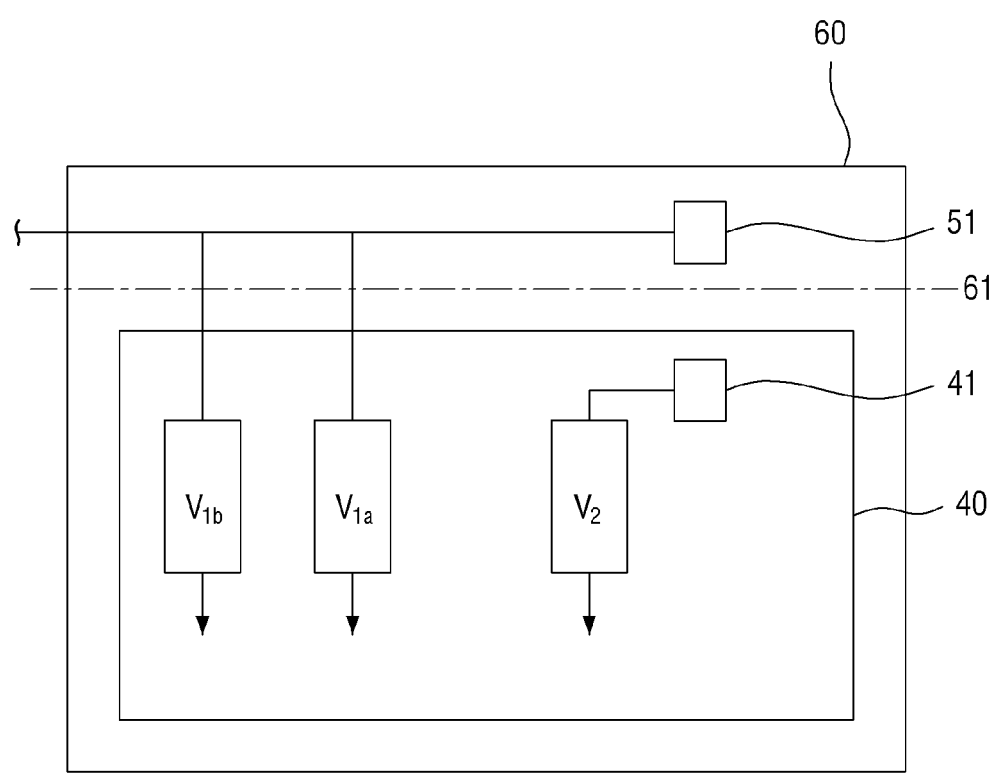

FIG. 15 is a flowchart illustrating a method of manufacturing the liquid crystal display device according to an embodiment of the invention. FIGS. 16 to 18 are diagrams for explaining the electric field application process in the method of manufacturing the liquid crystal display device according to an embodiment of the invention. Hereinafter, for convenience of description, the manufacturing method will be described based on the liquid crystal display device according to an embodiment of the invention described in FIGS. 1 to 10. Accordingly, any repetitive description of the features described above with reference to FIGS. 1 to 10 will hereinafter be omitted.

Referring to FIGS. 15 to 18, in an embodiment, the lower substrate 110, on which the shielding electrode 180 and the pixel electrode PE are provided, e.g., formed, is prepared (S100). In such an embodiment, the upper substrate 210, on which the common electrode CE is provided, is prepared (S200). In an embodiment, the lower substrate 110 and the upper substrate 210 may also be simultaneously formed or may be sequentially prepared. In an embodiment, where the lower substrate 110 and the upper substrate 210 are sequentially prepared, the order of the sequence is not particularly limited.

This will be described in greater detail referring to FIGS. 7 and 18. In an embodiment, a gate conductive layer is first formed on the lower substrate 110. In such an embodiment, the first scan line SL1, the second scan line SL2 and the gate electrode GE may be formed by etching a gate conductive layer using a photosensitive film pattern as a mask. In an alternative embodiment, where the gate conductor GW includes a storage line (not illustrated), the storage line may be formed together with the first scan line SL1, the second scan line SL2 and the gate electrode GE through the mask process.

Next, the photosensitive film pattern is removed and the gate insulating film 120 is formed on the gate conductor GW. The gate insulating film 120 may be formed by a chemical vapor deposition method.

The data conductive layer is formed on the gate insulating film 120. Thereafter, the semiconductor layer 130, the ohmic contact layer 140, the source electrode SE, the drain electrode DE and the first data line DL1 may be formed by etching the data conductive layer using the photosensitive film pattern as a mask.

Next, the photosensitive film pattern is removed, and a first inorganic insulating film is formed on the data conductor DW. The first inorganic insulating film may be formed of an inorganic insulating material such as silicon nitride and silicon oxide in an embodiment. Next, an organic insulating film including an organic material having photosensitivity is formed on the first inorganic insulating film. A second inorganic insulating film is formed on the organic insulating film. The second inorganic insulating film may be formed of an inorganic insulating material such as silicon nitride and silicon oxide in an embodiment. Next, a second passivation film 170, an organic insulating film 160 and a first passivation film 150 are formed by etching the second inorganic insulating film, the organic insulating film and the first inorganic insulating film, respectively. Thus, the drain electrode DE is partially exposed by the contact hole CNT.

Next, the transparent conductive layer is formed on the second passivation film 170. The transparent conductive layer includes a transparent conductive material such as ITO and IZO, or may be formed of a reflective metal such as aluminum, silver, chromium or an alloy thereof. Thereafter, a pixel electrode PE is formed by etching the transparent conductive layer.

In an embodiment, a transparent conductive layer is formed on the upper substrate 210 in which the black matrix BM, the color filter CF and the planarization layer 220 are formed. The transparent conductive layer may include a transparent conductive material such as ITO and IZO, or may be formed of a reflective metal such as aluminum, silver, chromium or an alloy thereof. Thereafter, a common electrode CE is formed by etching the transparent conductive layer.

Next, a liquid crystal layer 30 is formed between the lower display panel 10 and the upper display panel 20 (S300). Thereafter, the lower display panel 10 and the upper display panel 20 are aligned, and coupled or attached to each other. The lower display panel 10 and the upper display panel 20 may be bonded to each other through a sealing process in an embodiment. In an embodiment, annealing may be performed on the lower substrate 110 and the upper substrate 210 to improve the uniformity of the plurality of liquid crystal molecules 31 in the liquid crystal layer 30 after bonding.

Next, a first voltage V1 is provided to the first data line DL1 and may be supplied to the pixel electrode PE, and the first voltage V1 may also be provided to the shielding electrode 180. The common electrode CE may receive the second voltage V2 (S400). Here, the first voltage V1 and the second voltage V2 are different from each other in the voltage level. In such an embodiment, the pixel electrode PE and the shielding electrode 180 may receive the provision of the same first voltage V1. In an embodiment, the first voltage V1 may be about zero (0) volt (V) or a ground voltage, and the second voltage V2 may be about 13.5 V.

Thus, because the pixel electrode PE and the shielding electrode 180 are made equipotential, no electric field is generated between the pixel electrode PE and the shielding electrode 180. In such an embodiment, the electric field is generated between the pixel electrode PE and the common electrode CE, and between the shielding electrode 180 and the common electrode CE, by the potential difference therebetween. The plurality of liquid crystal molecules 31 is arranged depending on the electric field applied thereto.

In an embodiment, the plurality of first liquid crystal molecules 31a in the first region A1 is arranged to have an absolute value of the azimuthal angle different from the plurality of second liquid crystal molecules 31b in the second region A2 with respect to the first direction d1.

The absolute value of the azimuthal angle (a) of the plurality of first liquid crystal molecules 31a located in the first region A1 with respect to the first direction d1 may be about zero (0) degree to about +45 degrees. In such an embodiment, the plurality of first liquid crystal molecules 31a may include the liquid crystal molecules that are parallel to the first direction d1, that is, has an absolute value of the azimuthal angle (a) of zero (0). Here, the azimuthal angle (a) of the first liquid crystal molecules 31a may depend on the electric field applied thereto.

The plurality of second liquid crystal molecules 31b located in the second region A2 may be arranged to be substantially parallel to the lengthwise direction of the branch portion PEb. The plurality of second liquid crystal molecules 31b initially tends to be tilted in a direction perpendicular to the side of the branch portion PEb. However, because the directions of the horizontal components of the electric field caused by the sides of the adjacent branch portions PEb are opposite and a width between the branch portions PEb is narrow, the second liquid crystal molecules 31b tending to be tilted in the directions opposite to each other are tilted together in a direction parallel to the lengthwise direction of the branch portions PEb. The branch portion PEb and the first stem portion PEa1 or the second stem portion PEa2 may form an included angle that is greater than about +45 degrees and less than about 90 degrees, or greater than about −90 degrees and less than about −45 degrees. Accordingly, the absolute value of the azimuthal angle (b) of the second liquid crystal molecules 31b located in the second region A2 with respect to the first direction d1 may be greater than about 45 degrees and less than about 90 degrees.

Referring to FIG. 18, a first pad portion 51 and a display panel 40 may be disposed on a mother substrate 60. Of the first voltage V1, a voltage provided to the pixel electrode PE is defined as V1a, and a voltage provided to the shielding electrode 180 is defined as V1b.

In an embodiment, the first pad portion 51 may provide each of the first voltages V1a and V1b to the display panel 40. In such an embodiment, the first data line DL1 may receive provision of the first voltage V1a from the first pad portion 51 through the data driving portion and may supply the first voltage to the pixel electrode PE. In such an embodiment, the shielding electrode 180 may receive the first voltage V1b from the first pad portion 51. That is, the pixel electrode PE may the first voltages V1a and V1b having the same voltage level from the same first pad portion 51 as the shielding electrode 180.

The second pad portion 41 may be disposed on the display panel 40. The second pad portion 41 may provide a second voltage V2 to the common electrode CE.

In such an embodiment, the process (S400) of applying the voltage to the pixel electrode PE, the shielding electrode 180 and the common electrode CE may be performed before the display panel 40 is separated from the mother substrate 60. Accordingly, when the mother substrate 60 is cut along a cutting line 61, the first voltage V1a provided to the pixel electrode PE and the first voltage V1b provided to the shielding electrode 180 may become different from each other in voltage level.

Thereafter, an electric field exposure process of irradiating the liquid crystal layer 30 with light such as ultraviolet rays, while the electric field is being generated (S500). Accordingly, the pre-polymer included in the liquid crystal layer 30 or the first and second alignment films (not illustrated) may undergo a polymerization reaction to form a polymer. In an embodiment, where no pre-polymer is included in the first and second alignment film, a polymer such as a side chain for controlling the alignment of the plurality of liquid crystal molecules 31 with irradiation of light may be formed in the first and second alignment films. Such a polymer allows the plurality of first liquid crystal molecules 31a located in the first region A1 to be arranged to have an azimuthal angle (a) having an absolute value in a range of about zero (0) degree to about +45 degrees with respect to the first direction d1, even when the electric field is no longer generated in the liquid crystal layer 30. Further, the polymer allows the plurality of second liquid crystal molecules 31b located in the second region A2 to be arranged substantially parallel to the lengthwise direction of the branch portion PEb with respect to the first direction d1.

Thus, even when no electric field is generated between the lower substrate 110 and the upper substrate 210, the first liquid crystal molecules 31a are pre-tilted to have an azimuthal angle (a) having an absolute value in a range of about zero (0) degree to about +45 degrees with respect to the first direction d1. Accordingly, when an electric field is generated between the lower substrate 110 and the upper substrate 210, the lateral field generated in the outer region of the pixel portion PX may be relaxed such that the lateral visibility of the pixel portion PX is improved.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

What is claimed is:

1. A liquid crystal display device comprising:
a first substrate;
a shielding electrode disposed on the first substrate and which extends in a first direction;
a pixel electrode disposed on a same layer as the shielding electrode and insulated from the shielding electrode;
a common electrode which overlaps the shielding electrode and the pixel electrode in a thickness direction of the first substrate; and
a liquid crystal layer interposed between the common electrode and the pixel and shielding electrodes,
wherein the liquid crystal layer comprises a first liquid crystal molecule disposed in a first region between the shielding electrode and the pixel electrode, and
wherein the first liquid crystal molecule is pre-tilted to have an azimuthal angle in a range of about zero degree to about +45 degrees or in a range of about −45 degrees to about zero degree, based on the first direction.

2. The liquid crystal display device of claim 1, wherein the pixel electrode comprises:
a stem portion extending in the first direction; and
a plurality of branch portions extending from the stem portion, and
an angle formed between at least one of the plurality of branch portions and the stem portion is about +45 degrees or about −45 degrees.

3. The liquid crystal display device of claim 2, wherein the liquid crystal layer further comprises a second liquid crystal molecule disposed in a second region, which is a region between two adjacent branch portions of the plurality of branch portions in the thickness direction of the first substrate, and
the second liquid crystal molecule is pre-tilted at an azimuthal angle having an absolute value greater than an absolute value of the azimuthal angle of the first liquid crystal molecule based on the first direction.

4. The liquid crystal display device of claim 1, further comprising:
a second substrate which faces the first substrate,
wherein the common electrode is disposed on the second substrate.

5. The liquid crystal display device of claim 1, wherein a longitudinal axis of the first liquid crystal molecules is parallel to the first direction.

6. The liquid crystal display device of claim 1, further comprising:
a first scan line disposed on the first substrate and which extends in the first direction;
a second scan line disposed on a same layer as the first scan line and adjacent to the first scan line;
a first insulating film disposed on the first scan line and the second scan line;
a data line disposed on the first insulating film and which extends in a second direction different from the first direction; and
a second insulating film disposed on the data line,
wherein the pixel electrode and the shielding electrode are disposed on the second insulating film, and
wherein the pixel electrode is electrically connected to the second scan line.

7. The liquid crystal display device of claim 6, further comprising:

a third insulating film disposed on the second insulating film,
wherein the second insulating film is an organic insulating film, and
wherein the pixel electrode and the shielding electrode are disposed on the third insulating film.

8. The liquid crystal display device of claim 7, wherein the second pixel electrode at least partially overlaps the first scan line.

9. A liquid crystal display device comprising:
a first substrate;
a shielding electrode disposed on the first substrate and which extends in a first direction;
a pixel electrode disposed on a same layer as the shielding electrode and insulated from the shielding electrode, wherein the pixel electrode comprises a stem portion extending in the first direction and a plurality of branch portions extending from the stem portion;
a second substrate which faces the first substrate;
a common electrode disposed on the second substrate, and which overlaps the pixel electrode and the shielding electrode when viewed from a plan view in a perpendicular direction based on the first substrate; and
a liquid crystal layer interposed between the first substrate and the second substrate, wherein the liquid crystal layer comprises a first liquid crystal molecule and a second liquid crystal molecule,
wherein the first liquid crystal molecule is in a first region between the shielding electrode and the pixel electrode when viewed from the plan view, and is pre-tilted to have a first azimuthal angle based on the first direction,
wherein the second liquid crystal molecule is in a second region between two adjacent branch electrodes of the plurality of branch portions when viewed from the plan view, and is pre-tilted to have a second azimuthal angle based on the first direction, and
an absolute value of the first azimuthal angle is smaller than an absolute value of the second azimuthal angle.

10. The liquid crystal display device of claim 9, wherein the first azimuthal angle is in a range of about zero degree to about +45 degrees or in a range of about −45 degrees to about zero degree based on the first direction.

11. The liquid crystal display device of claim 9, wherein an angle formed between at least one of the plurality of branch portions and the stem portion is greater than about +45 degrees and less than about 90 degrees or greater than about −90 degrees and less than about −45 degrees.

12. The liquid crystal display device of claim 9, wherein a longitudinal axis of the first liquid crystal molecule is parallel to the first direction.

13. The liquid crystal display device of claim 9, further comprising:
a scan line disposed on the first substrate and which extends in the first direction;
a first insulating film disposed on the scan line;
a data line disposed on the first insulating film and which extends in a second direction different from the first direction; and
a second insulating film disposed on the data line,
wherein the pixel electrode and the shielding electrode are disposed on the second insulating film, and
wherein at least a portion of the shielding electrode overlaps the scan line in a perpendicular direction based on the first substrate.

14. The liquid crystal display device of claim 13, further comprising:
a black matrix disposed on the second substrate;

a color filter disposed on the black matrix, and
a planarization film disposed on the color filter,
wherein the common electrode is disposed on the planarization layer.

15. A method of manufacturing a liquid crystal display device, the method comprising:
preparing a first substrate, on which a shielding electrode extending in a first direction and a pixel electrode disposed on a same layer as the shielding electrode are provided;
preparing a second substrate, on which a common electrode to be disposed to overlap the shielding electrode and the pixel electrode in a direction perpendicular to the first substrate is provided;
providing a liquid crystal layer between the first substrate and the second substrate, wherein the liquid crystal layer comprises a first liquid crystal molecule, which is disposed in a first region between the pixel electrode and the shielding electrode;
applying a first voltage to the pixel electrode and the shielding electrode, and applying a second voltage, which is different from the first voltage, to the common electrode; and
irradiating the liquid crystal layer with light to pre-tilt the liquid crystal molecules.

16. The method of claim 15, wherein first liquid crystal molecule is pre-tilted to have an azimuthal angle in a range of about zero degree to about +45 degrees or in a range of about −45 degree to about zero degree based on the first direction.

17. The method of claim 15, wherein
the pixel electrode comprises a stem portion extending in the first direction, and a plurality of branch portions extending from the stem portion,
the liquid crystal layer further comprises a second liquid crystal molecule in a second region between two adjacent branches of the plurality of branch portions in the perpendicular direction based on the first substrate,
the first liquid crystal molecule is pre-tilted to have a first azimuthal angle based on the first direction, and
the second liquid crystal molecule is pre-tilted to have a second azimuthal angle having an absolute value greater than an absolute value of the first azimuthal angle based on the first direction.

18. The method of claim 15, wherein an angle formed between at least one of the plurality of branch portions and the stem portion is about +45 degrees or about −45 degrees.

19. The method of claim 15, further comprising:
applying the first voltage to a data line, which is disposed on the first substrate, extending in a second direction different from the first direction, and electrically connected to the pixel electrode.

20. The method of claim 15, wherein a longitudinal axis of the first liquid crystal molecule is parallel to the first direction.

21. A liquid crystal display device comprising:
a first substrate;
a first scan line disposed on the first substrate and extending in a first direction;
a data line disposed on the first substrate and extending in a second direction, which is different form the first direction;
a pixel electrode electrically connected to the scan line and the data line;
a shielding electrode disposed on the scan line and the data line;
a common electrode facing the pixel electrode; and
a liquid crystal layer comprising a plurality of liquid crystal molecules and disposed between the pixel electrode and the common electrode,
wherein the shielding electrode comprises a first sub shielding electrode which overlaps the scan line and is spaced apart from the pixel electrode when viewed from a plan view in a thickness direct of the first substrate,
wherein the liquid crystal molecules comprises a first liquid crystal molecule disposed in a region between the first sub shielding electrode and the pixel electrode when viewed from the plan view, and
wherein a longitudinal axis of the first liquid crystal molecule is pre-tilted at an azimuthal angle in a range of about zero degree to about +45 degrees or in a range of about −45 degrees to about zero degree with respect to the first direction when viewed from the plan view.

22. The liquid crystal display device of claim 21, wherein
the pixel electrode comprises a plurality of branch electrodes extending at an angle in a range of about −45 degrees to about +45 degrees with respect to the first direction,
the liquid crystal molecules further comprises a second liquid crystal molecule disposed in a region between two adjacent branch electrode of the branch electrodes when viewed from the plan view, and
a longitudinal axis of the second liquid crystal molecule is pre-tilted at an azimuthal angle in a range of about +45 degrees to about +90 degrees or in a range of about −90 degrees to about −45 degrees when viewed from the plan view.

23. The liquid crystal display device of claim 21, wherein the shielding electrode further comprises a second sub shielding electrode which overlaps the data line when viewed from the plan view.

24. The liquid crystal display device of claim 21, further comprising:
an additional scan line disposed on the first substrate, extending in a first direction,
wherein the pixel electrode is disposed between the scan line and the additional scan line, and
wherein the pixel electrode partially overlaps the additional scan line.

25. The liquid crystal display device of claim 21, further comprising:
a first insulating film disposed between the scan line and the data line; and
a second insulating film disposed between the data line and the shielding electrode and between the data line and the scan line.

* * * * *